(12) United States Patent
Heiskanen et al.

(10) Patent No.: US 11,619,004 B2
(45) Date of Patent: Apr. 4, 2023

(54) METHOD FOR DEWATERING A WEB COMPRISING MICROFIBRILLATED CELLULOSE AND A FILM PRODUCED FROM THE DEWATERED WEB

(71) Applicant: Stora Enso OYJ, Helsinki (FI)

(72) Inventors: Isto Heiskanen, Imatra (FI); Jukka Kankkunen, Imatra (FI); Riku Pihko, Jyväskylä (FI); Vesa Kunnari, Tuusula (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 17/292,191

(22) PCT Filed: Nov. 8, 2019

(86) PCT No.: PCT/IB2019/059598
§ 371 (c)(1),
(2) Date: May 7, 2021

(87) PCT Pub. No.: WO2020/095254
PCT Pub. Date: May 14, 2020

(65) Prior Publication Data
US 2021/0324580 A1   Oct. 21, 2021

(30) Foreign Application Priority Data
Nov. 9, 2018   (SE) .................... 1851394-5

(51) Int. Cl.
*D21F 3/08* (2006.01)
*D21F 3/04* (2006.01)
*D21F 7/12* (2006.01)
*D21H 11/18* (2006.01)

(52) U.S. Cl.
CPC ............. *D21F 3/08* (2013.01); *D21F 3/045* (2013.01); *D21F 7/12* (2013.01); *D21H 11/18* (2013.01)

(58) Field of Classification Search
CPC ... D21F 3/08; D21F 7/12; D21F 3/045; D21F 11/00; D21H 11/18; C08J 5/18
See application file for complete search history.

(56) References Cited

U.S. PATENT DOCUMENTS

| | | | |
|---|---|---|---|
| 5,776,307 A | | 7/1998 | Ampulski et al. |
| 2009/0020139 A1 | | 1/2009 | Sumnicht et al. |
| 2009/0020248 A1 | | 1/2009 | Sumnicht et al. |
| 2013/0269898 A1 | | 10/2013 | Shirao et al. |
| 2015/0068973 A1* | | 3/2015 | Bessonoff .......... B01D 67/0095 210/500.29 |
| 2015/0315747 A1 | | 11/2015 | Heiskanen et al. |
| 2015/0322170 A1 | | 11/2015 | Häggblom et al. |
| 2016/0130757 A1 | | 5/2016 | Mikami et al. |
| 2016/0214357 A1* | | 7/2016 | Larsson ................ D21H 27/10 |
| 2017/0254025 A1 | | 9/2017 | Miller et al. |
| 2018/0002864 A1 | | 1/2018 | Ziegenbein |
| 2018/0187377 A1 | | 7/2018 | Ziegenbein |
| 2018/0245286 A1 | | 8/2018 | Heiskanen et al. |
| 2018/0245287 A1 | | 8/2018 | Heiskanen et al. |
| 2018/0245289 A1 | | 8/2018 | Heiskanen et al. |
| 2019/0048527 A1 | | 2/2019 | Heiskanen et al. |
| 2019/0226146 A1* | | 7/2019 | Pihko ..................... D21H 19/00 |

FOREIGN PATENT DOCUMENTS

| | | |
|---|---|---|
| CN | 1226299 A | 8/1999 |
| CN | 108026696 A | 5/2018 |
| CN | 108026697 A | 5/2018 |
| CN | 108026698 A | 5/2018 |
| CN | 108026702 A | 5/2018 |
| EP | 2707540 A1 | 3/2014 |
| EP | 3066258 A1 | 9/2016 |
| JP | 2017110327 A | 6/2017 |
| JP | 2018059236 A | 4/2018 |
| WO | 2012156880 A1 | 11/2012 |
| WO | 2015068019 A1 | 5/2015 |
| WO | 2018060868 A1 | 4/2018 |
| WO | 2018092056 A1 | 5/2018 |

OTHER PUBLICATIONS

Fengel, D., Ultrastructural behaviour of cell wall polysaccharides, TAPPI, 1970, vol. 53, No. 3, pp. 497-503 (abstract only).
Chinga-Carrasco, Gary, Cellulose fibres, nanofibrils and microfibrils: The morphological sequence of MFC components from a plant physiology and fibre technology point of view, Nanoscale Research Letters, 2011, 6:417.
International Search Report from corresponding PCT application No. PCT/IB2019/059598 dated Jan. 24, 2020.
Extended European Search report from corresponding European patent application No. 19882776.8 dated Jun. 7, 2022.

\* cited by examiner

*Primary Examiner* — Jacob T Minskey
*Assistant Examiner* — Matthew M Eslami
(74) *Attorney, Agent, or Firm* — Greer, Burns & Crain, Ltd.

(57) ABSTRACT

The present invention relates to a method for dewatering a web comprising microfibrillated cellulose, wherein the method comprises the steps of: providing a suspension comprising between 50 weight-% to 100 weight-% of microfibrillated cellulose based on total dry weight, forming a fibrous web of said suspension on a support wherein said web has a dry content of 1-25% by weight, applying a dewatering felt into direct contact with the fibrous web, conducting said fibrous web, arranged between said dewatering felt and said substrate, through a pressing equipment. The invention further relates to a film produced from said method.

12 Claims, No Drawings

METHOD FOR DEWATERING A WEB COMPRISING MICROFIBRILLATED CELLULOSE AND A FILM PRODUCED FROM THE DEWATERED WEB

This application is a U.S. National Phase under 35 U.S.C. § 371 of International Application No. PCT/IB2019/059598, filed Nov. 8, 2019, which claims priority under 35 U.S.C. §§ 119 and 365 to Swedish Application No. 1851394-5, filed Nov. 9, 2018.

TECHNICAL FIELD

The present invention relates to a method for dewatering a fibrous web comprising microfibrillated cellulose and a film comprising microfibrillated cellulose produced from the dewatered web.

BACKGROUND

Films comprising microfibrillated cellulose (MFC) has been known to have good strength and oxygen barrier properties. This is for example described by Syverud, "Strength and barrier properties of MFC films", Cellulose 2009 16:75-85 where MFC films with a basis weight of between 15-30 gsm was produced and the strength and barrier properties was investigated.

During production of MFC films it is not easy to dewater and produce the film at high speed due to the characteristics properties of microfibrillated cellulose. When MFC films are used, for example as barriers, it is crucial that the films don't have any pinholes or other defects that negatively would affect the barrier properties. Thus, it is important that the surface of the MFC film is smooth.

Wet laid techniques can be used for the production of MFC films, i.e. dewatering a furnish comprising said MFC on a wire. However, it is difficult to produce a MFC film with good barrier properties and at high production speed by wet laid techniques. It is easy to get wire marks which will negatively affect the barrier and optical properties of the film. Furthermore, it is difficult to get a good retention of small fibrils present in the furnish when using a wire.

It is also possible to create smooth MFC films by using film casting methods, i.e. casting of the film on a plastic or metal surface and then drying the film slowly. Casting methods have been shown to produce MFC films with very smooth surfaces with good barrier properties. However, the method is too slow and inefficient for production in commercial scale.

There is thus a need for a new method to dewater a suspension comprising microfibrillated cellulose and to produce a MFC film with good barrier properties at a high production speed.

SUMMARY

It is an object of the present invention to provide a method for dewatering and producing a film comprising microfibrillated cellulose in an efficient way without negatively affecting the barrier properties of the film, which method further eliminates or alleviates at least some of the disadvantages of the prior art methods.

The invention is defined by the appended independent claims. Embodiments are set forth in the appended dependent claims and in the following description.

The present invention relates to a method for dewatering a web comprising microfibrillated cellulose, wherein the method comprises the steps of: providing a suspension comprising between 50 weight-% to 100 weight-% of microfibrillated cellulose based on total dry weight, forming a fibrous web of said suspension on a support wherein said web has a dry content of 1-25% by weight, applying a dewatering felt into direct contact with the fibrous web, conducting said fibrous web, arranged between said dewatering felt and said substrate, through a pressing equipment and drying the dewatered web to form a film which has good barrier properties. It has been found that it is possible to dewater a web comprising high amounts of microfibrillated cellulose by applying a dewatering felt into contact with the web prior to conducting it though a pressing equipment. In this way it is possible to dewater the web in an efficient way which leads to that the dewatering speed can be increased at the same time as the produced film will have good barrier properties.

The pressing equipment preferably comprises an extended nip. The pressing equipment is preferably is a belt press. The fibrous web is preferably treated in the belt press for a distance of at least 20% of the diameter of the roll of the belt press. By using an extended nip, preferably a belt press it was found possible to dewater the web in an improved way and thus be able to increase the production speed of the dewatering process.

The dewatering felt is preferably applied to the fibrous web at least 20 cm before being conducted through the pressing equipment. By applying the dewatering felt into direct contact with the fibrous web at a distance of at least 20 cm before being conducted through the pressing equipment, the dewatering of the web was shown to improve. It was possible to increase the pressure used in the pressing equipment and to increase the speed of the dewatering process.

The pressure used in the pressing equipment is preferably between 1-100 bar, preferably between 2-70 bar or even more preferred between 5-50 bar. It is preferred that the pressure used in the pressing equipment is gradually increased during the treatment in the pressing equipment. By gradually or stepwise increase the pressure in the pressing equipment the dewatering of the web is improved, i.e. a web with a higher dry content can be produced without destroying the barrier properties.

The support is preferably a metal support. The metal support is preferably heated to a temperature between 30-150 ° C. before the web is applied to the support. The fibrous web is preferably formed by cast coating.

The support may also be a porous wire. It is thus possible to use a wire in a paper or paperboard machine.

The fibrous web preferably has a dry content of 15-50 weight-% after dewatering in the pressing equipment.

The microfibrillated cellulose of the suspension preferably has a Schopper-Riegler (SR) value above 90.

The web is preferably conducted through the pressing equipment at a speed of at least 50 m/min. It is thus possible to dewater the web at a quite high speed and still be able to produce a web with high dry content and that can be further dried to produce a film having very good barrier properties.

The method preferably further comprises the step of drying the dewatered web to form a film. The dewatered web is preferably further dried by any known method to produce a film having good barrier properties.

The fibrous web is preferably heated before the dewatering felt is applied into contact. In this way the temperature and the solid content of the fibrous web is increased which further improves the subsequent dewatering of the fibrous web.

The film produced according to the method described above, preferably has a grammage below 40 gsm, preferably below 30 gsm and a density above 700 kg/m$^3$. The film preferably has an Oxygen Transmission Rate (OTR) value (23° C., 50% RH) below 400 cc/m$^2$/24 h according to ASTM D-3985. It is consequently possible to produce a thin high density film comprising high amounts of MFC that has good oxygen barrier properties by the present invention.

DETAILED DESCRIPTION

It has surprisingly been found that it is possible to dewatering a web comprising MFC in an improved way by applying a dewatering felt into direct contact with the web followed by conducting the web to a pressing equipment. The dewatering felt is applied into direct contact with the fibrous web and said fibrous web, arranged between said dewatering felt and said substrate, is conducted through the pressing equipment. By the method according to the invention it is possible to dewater the web in a good and very efficient way and still be able to produce a film from the dewatered fibrous web having good barrier properties. It has surprisingly been found that the use of a dewatering felt followed by treatment in a pressing equipment made it possible to dewater the fibrous web comprising high amounts of MFC at an increased production speed without deteriorating the barrier properties of the web or produced film. The dewatering of a web comprising high amounts of MFC is one of the most challenging process steps in order to produce a film with good barrier properties, i.e. to produce a product with a limited amount of pinholes or other irregularities that will affect the barrier properties of the product. Consequently, it is important that the dewatering is done in a good way to avoid poor barrier properties. It has thus been very difficult to be able to increase the production speed of the dewatering step of a web comprising high amounts of microfibrillated cellulose without deteriorating the barrier properties.

The suspension comprises between 50weight-% to 100 weight-% of microfibrillated cellulose based on total dry weight, preferably between 70 weight-% to 100 weight-%. Thus, a film produced from the dewatered fibrous web comprises high amount of MFC, preferably between 70-100% by weight of MFC, this relates to the amount of MFC in the film per se before eventual coating layers have been added.

With dewatering felt is meant a felt that is permeable and allows water to be removed from the web either by absorbing the water or by allowing the water to be removed through the felt. Dewatering felts is today often used for dewatering paper or paperboard webs. Any known dewatering felt can be used.

It can be preferred to use more than one dewatering felts, preferably two dewatering felts. It is preferred to use a first dewatering felt with low grammage and low water permeability that would prevent fines to penetrate through the felt and a second dewatering felt with high water absorption properties.

The dewatering felt is preferably applied to the fibrous web, i.e. in direct contact to the fibrous web, at least 20 cm before being conducted through the pressing equipment. It is preferred that the dewatering felt is applied to the fibrous web at a distance between 20 cm to 5 meter, even more preferable between 50 cm to 3 meters before the fibrous web is conducted through the pressing equipment. It is preferred that no external pressure is used on the felt when applied to the fibrous web before being conducted through the pressing equipment. It may be possible wrap the support, the fibrous web and the dewatering felt around a roll and in this way create a small dewatering pressure but it is important not to use too high pressure and no pressure by the use of a nip roll/s can be used. It has surprisingly been found that by combining the use a dewatering felt at a distance before increasing the dewatering in a pressing equipment is was possible dewater the web without the fibrils of the microfibrillated cellulose to move into the dewatering felt and cause clogging of the felt.

The felt or felts is preferably cleaned and dewatered after being conducted through the pressing equipment and separated from the dewatered web.

With pressing equipment is meant an equipment forming a nip through which the fibrous web is conduced and thus pressed and dewatered. The pressing equipment preferably comprises an extended nip and it is preferred that the pressing equipment is a belt press. The belt press comprises a metal belt and a roll and the dewatering of the web is done by applying the web between the metal belt and the roll. It may be preferred to increase the length of the nip by treating the fibrous web in the belt press for a distance of at least 20% of the diameter of the roll of the belt press. It was found that it is possible to increase the nip length of the dewatering of the fibrous web and still be able to increase the dewatering speed without deteriorating the barrier properties of the film produced from the web. The pressing equipment may comprise more than one nip.

The pressure used in the pressing equipment is preferably between 1-100 bar, preferably between 2-70 bar, preferably between 5-50 bar, preferably between 5-30 bar, even more preferred between 5-20 bar and even more preferred between 10-20 bar. It may be preferred to gradually increase the pressure in the pressing equipment. It is preferred to use a pressure between 5-10 bar in the beginning of the pressing equipment and gradually increase the pressure to 10-15 bar and thereafter optionally further increase the pressure to 20-25 bar and optionally increase the pressure to between 30-40 bar followed by optionally increasing the pressure to 50-70 bar. The increased pressure may be done in the same pressure nip, e.g. in an extended nip or the pressing equipment may comprise more than one nips.

The formed fibrous web is applied to a support on which the fibrous web is conducted through the pressing equipment. It is important to apply the suspension to the support in such way that a homogeneous fibrous web is formed, meaning that the fibrous web should be as uniform as possible with as even thickness as possible etc.

The fibrous web is preferably formed by cast coating the suspension to a polymer or metal substrate. It was surprisingly found that by the dewatering method according to the invention makes it possible to increase the dewatering of a cast coated suspension on a substrate. Consequently, the present invention makes it possible to produce a smooth and good barrier property film at high speed by the use of cast coating. The support is preferably a metal support, i.e. the support is made from metal. The metal support of preferably heated to a temperature above 30° C., preferably between 30-150° C., preferably between 45-150° C., even more preferred between 60-100 ° C. before the web is applied to the support. By increasing the temperature of the belt and thus on the applied web it has been found possible to further increase the efficiency of the dewatering of the web in the pressing equipment.

The support may be a porous wire, preferably a wire in a paper or paperboard machine. It is thus possible to apply the method in the wet end of a paper or paperboard machine.

With paper or paperboard machine is meant any kind of paper making machine known to a person skilled in the art used for making paper, paperboard, tissue or any similar products The support may also be a paper or paperboard product. By the present invention it is possible to produce a multiply paper or paperboard product by applying a layer with microfibrillated cellulose according to the present invention.

The dry content of the fibrous web after dewatering in the pressing equipment is preferably between 15-50 weight-%.

The microfibrillated cellulose of the suspension preferably has a Schopper-Riegler (SR) value above 90, preferably above 95. Consequently, the suspension comprises a fine grade MFC quality which normally is very difficult to dewater.

The web is preferably conducted through the pressing equipment at a speed of at least 50 m/min, preferably above 100 m/min and even more preferably above 200 m/min. With the present invention it was found possible to increase the production speed for dewatering a fibrous web comprising high amounts of MFC. Consequently, since the dewatering often is the most challenging process step for the production of a MFC film having good barrier properties, the production speed of the entire film can also be improved and it makes it possible to produce a MFC film in a much more cost efficient way.

The fibrous web is preferably heated before the dewatering felt is applied into contact. In this way the temperature and the solid content of the fibrous web is increased which further improves the subsequent dewatering of the fibrous web. The increased heat may be applied using any known way. The fibrous web is preferably heated to a temperature between above 40° C., preferably between 50-95° C.

The invention further relates to a method to produce a film wherein the method comprises the steps of; providing a suspension comprising between 50 weight-% to 100 weight-% of microfibrillated cellulose based on total dry weight, preferably between 70 weight-% to 100 weight-% of MFC, forming a fibrous web of said suspension wherein said web has a dry content of 1-25% by weight, applying a dewatering felt into direct contact with the fibrous web, conducting said fibrous web, arranged between said dewatering felt and said substrate, through a pressing equipment to form dewatered web and drying said web to form a film.

The dewatered fibrous web preferably has a dry content of 15-50 weight-% after dewatering in the pressing equipment. The dewatered web formed may thereafter be further treated in order to form a film. The dewatered web may be dried or further dewatered in any conventional way, e.g. by additional pressing or conventional cylinder drying, by using vacuum and/or by the use of hot air, in order for it to have the appropriate dry content. The film preferably has a dry content above 95% by weight. It may also be possible to treat the dewatered web in any way known to a person skilled in the art in order to produce a film, e.g. by calendering.

With film is meant a thin substrate with good gas, aroma or grease or oil barrier properties, preferably oxygen barrier properties. The film preferably has a basis weight of less than 40 g/m$^2$ and a density in the range from 700-1400 kg/m$^3$. The oxygen transmission rate (OTR) value of a film having a grammage of 30 g/m$^2$ at 23° C. and at a relative humidity of 50%, is preferably below 30 cc/m$^2$/24 h according to ASTM D-3985.

Besides MFC, the film may also comprise longer cellulosic fibers, either hardwood or softwood fibers, preferably kraft pulp softwood fibers. It may be preferred that the film comprises a mixture of MFC with SR value above 90 and a more coarse MFC grade having a SR value between 60-90. The film may also comprise other additives, such as pigments, carboxymethylcelluose (CMC), retention chemicals, starch etc. The film may comprise minerals, such as clays and preferably bentonite. It may be preferred that the film comprises 10-50% by weight of bentonite. By increasing the bentonite content of the film it was found possible to increase the dry content of the web.

By the present invention it is possible to produce a film comprising microfibrillated cellulose that preferably has a grammage below 40 gsm, preferably below 30 gsm and a density above 700 kg/m$^3$. The film preferably has an Oxygen Transmission Rate (OTR) value (23° C., 50% RH) below 400 cc/m$^2$/24 h, more preferably below 100 cc/m$^2$/24 h according to ASTM D-3985. The film according to the present invention is preferably a thin translucent or transparent film, with a high density, high smoothness and good barrier properties.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., Cellulose fibres, nanofibrils and microfibrils,: The morphological sequence of MFC components from a plant physiology and fibre technology point of view, *Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanocellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hem icellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The MFC film according to the present invention may be used as bag in boxes when packaging dry food such as cereals, as a wrapping substrate, as a laminate material in paper, paperboard or plastics and/or as a substrate for disposable electronics.

EXAMPLE

A suspension comprising 87% of MFC and 13% of sorbitol was cast coated onto a metal support to form a web. The solid content of the suspension during casting was 3%.

A sample according to the invention (Sample 1) was produced by drying the web on the support by applying a dewatering felt into contact with the web. The solid content of the web was 5.5% when the felt was applied. The web and dewatering felt was then conducted through a pressing equipment where a pressure of 62 bar was applied and the solid content of the web after dewatering was 44%. Additional drying by impingement drying was applied in order to dry the formed film.

A sample (Sample 2) was produced as a comparative example by drying the formed web on the metal support by applying heat by placing the support on a heated metal block.

The OTR value of the films from Sample 1 and Sample 2 was measured according to ASTM D-3985 and the results are shown in Table 1.

TABLE 1

Results of the barrier properties of the films

| Sample | Press dewatering applied | % of water removed by pressing | Thickness μm | OTR 23° C./50 % RH |
|---|---|---|---|---|
| 1 | Yes | 49% | 19.7 | 3.6 |
| 2 | No | 0% | 18.0 | 3.2 |

As can be seen from the results in Table 1 it was possible to use a dewatering felt and applying pressure to reduce a large amount of water and still be able to produce a film with good barrier properties.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for dewatering a web comprising microfibrillated cellulose, wherein the method comprises the steps of:
   providing a suspension comprising between 50 weight-% to 100 weight-% of microfibrillated cellulose based on a total dry weight,
   forming a fibrous web of said suspension on a support, wherein said fibrous web has a dry content of 1-25% by weight and wherein said support is a metal support wherein said fibrous web is formed by cast coating on the metal support so that a surface on the metal support is smooth, wherein the metal support is heated to a temperature between 30-150° C. before said fibrous web is applied to the support,
   applying a dewatering felt into direct contact with said fibrous web after said fibrous web has been formed,
   conducting said fibrous web, arranged between said dewatering felt and said support, through a pressing equipment to provide a dewatered web, and
   drying the dewatered web to form a film which has an Oxygen Transmission Rate (OTR) value (23° C., 50% RH) below 400 cc/m$^2$/24 h according to ASTM D-3985.

2. The method as claimed in claim 1, wherein the pressing equipment comprises an extended nip.

3. The method according to claim 1, wherein the pressing equipment is a belt press.

4. The method according to claim 3, wherein the fibrous web is treated in the belt press for a distance of at least 20% of a diameter of a roll of the belt press.

5. The method according to claim 1, wherein the dewatering felt is applied to the fibrous web at least 20 cm before being conducted through the pressing equipment.

6. The method according to claim 1, wherein a pressure used in the pressing equipment is between 1-100 bar.

7. The method according to claim 1, wherein a pressure used in the pressing equipment is gradually increased.

8. The method according to claim 1, wherein said fibrous web has a dry content of 15-50 weight-% after dewatering in the pressing equipment.

9. The method according to claim 1, wherein the microfibrillated cellulose of the suspension has a Schopper-Riegler (SR) value above 90.

10. The method according to claim 1, wherein said fibrous web is conducted through the pressing equipment at a speed of at least 50 m/min.

11. The method according to claim 1, wherein said fibrous web is heated before the dewatering felt is applied into contact.

12. A film comprising:
    microfibrillated cellulose and obtained by the method of claim 1, wherein said film has a density above 700 kg/m³ and an Oxygen Transmission Rate (OTR) value (23° C., 50% RH) below 400 cc/m²/24 h according to ASTM D-3985.

* * * * *